(12) United States Patent
Lim et al.

(10) Patent No.: US 11,958,953 B2
(45) Date of Patent: Apr. 16, 2024

(54) HARD COATING FILM AND IMAGE DISPLAY DEVICE COMPRISING SAME

(71) Applicant: DONGWOO FINE-CHEM CO., LTD., Jeollabuk-do (KR)

(72) Inventors: Geo San Lim, Seoul (KR); Seung Hee Kim, Gyeonggi-do (KR); Hye Lin Kim, Busan (KR)

(73) Assignee: DONGWOO FINE-CHEM CO., LTD., Iksan-si (KR)

( * ) Notice: Subject to any disclaimer, the term of this patent is extended or adjusted under 35 U.S.C. 154(b) by 687 days.

(21) Appl. No.: 17/059,258

(22) PCT Filed: May 27, 2019

(86) PCT No.: PCT/KR2019/006341
§ 371 (c)(1),
(2) Date: Nov. 27, 2020

(87) PCT Pub. No.: WO2019/235769
PCT Pub. Date: Dec. 12, 2019

(65) Prior Publication Data
US 2021/0206934 A1    Jul. 8, 2021

(30) Foreign Application Priority Data

Jun. 8, 2018   (KR) .......................... 10-2018-0066084

(51) Int. Cl.
*C08J 7/046* (2020.01)
*C08K 11/00* (2006.01)
*C09D 133/08* (2006.01)
*G02B 1/14* (2015.01)

(52) U.S. Cl.
CPC .............. *C08J 7/046* (2020.01); *C08K 11/00* (2013.01); *C09D 133/08* (2013.01); *G02B 1/14* (2015.01); *C08J 2335/08* (2013.01)

(58) Field of Classification Search
None
See application file for complete search history.

(56) References Cited

U.S. PATENT DOCUMENTS

2018/0201000 A1 *   7/2018   Kim .......................... C08J 7/044

FOREIGN PATENT DOCUMENTS

| JP | 2001225797 A | 8/2001 | | |
|---|---|---|---|---|
| JP | 2006106427 | 4/2006 | | |
| JP | 2017021336 A | 1/2017 | | |
| KR | 10-2012-010371 | 4/2006 | | |
| KR | 10-2016-010368 | 9/2016 | | |
| KR | 10-2017-001629 | 2/2017 | | |
| KR | 10-2017-009816 | 8/2017 | | |
| KR | 10-2018-001795 | 2/2018 | | |
| KR | 10-2018-004308 | 4/2018 | | |
| WO | WO-2013191254 A1 * | 12/2013 | ............. | B32B 27/16 |
| WO | WO-2017023117 A1 * | 2/2017 | ............. | B32B 27/30 |
| WO | 2017221725 A1 | 12/2017 | | |

* cited by examiner

*Primary Examiner* — Alexander M Weddle
(74) *Attorney, Agent, or Firm* — BKRIP LLC

(57) ABSTRACT

A hard coating film may include a substrate and a hard coating layer provided on at least one surface of the substrate, in which, when the hard coating film is folded and unfolded 200,000 times with a bending radius of 1 mm in the direction in which the hard coating layer is oriented inwards under 60° C. and 90% relative humidity (RH), breakage does not occur, and the amount of change in transmission b* (chromaticity) of the film after UV irradiation for 100 hr using a 15 W UV-B lamp is 1.5 or less. The hard coating film may exhibit superior anti-curling properties, superior bending resistance under high-temperature and high-humidity conditions, and high light resistance, and can thus be applied not only to an image display device but also to a window for a flexible display device.

6 Claims, No Drawings

HARD COATING FILM AND IMAGE DISPLAY DEVICE COMPRISING SAME

CROSS-REFERENCE TO RELATED APPLICATIONS

This application is a national phase entry under 35 U. S.C. § 371 of International Patent Application PCT/KR2019/006341, filed May 27, 2019, designating the United States of America and published in Korean as International Patent Publication WO 2019/235769 A1, which claims priority to the Korean Patent Application KR 10-2018-0066084, filed on Jun. 8, 2018, each of which is incorporated herein by this reference in its entirety.

TECHNICAL FIELD

The present invention relates to a hard coating film and an image display device including the same.

BACKGROUND

A flexible display is a display that is bendable or foldable, and various technologies and patents related thereto have been proposed. When the display is designed to have a foldable form, it may be used as a tablet when unfolded and a smartphone when folded, so displays having different sizes may be used in a single product. In addition, in the case of larger-sized devices such as tablets and TVs, rather than small-sized smartphones, convenience may be doubled if they may be folded and carried.

In a general display, a cover window made of glass is provided on the outermost side to protect the display. However, glass cannot be applied to foldable displays, and a hard coating film having high hardness and wear resistance is used in place of glass.

In order to obtain hardness at the level of glass, the hard coating layer in the hard coating film has to be formed thick. The surface hardness may increase with an increase in the thickness thereof, but cracking or peeling of the hard coating layer occurs easily while wrinkles and curls increase due to shrinkage of the hard coating layer during curing, making it difficult to achieve real-world application thereof.

With the goal of solving this problem, Korean Patent Application Publication No. 2012-0103717 discloses an optical laminate and a hard coating film. Here, the hard coating film is configured such that a hard coating layer is formed on a resin film, and satisfies A×1,500<B (in which 0.003 mm≤A≤0.020 mm) when the thickness of the hard coating layer is set to A (mm) and the width (edge width) ranging from the edge of the resin film to the edge of the hard coating layer is set to B (mm).

In addition, Japanese Patent Application Publication No. 2006-106427 discloses a hard coating film, an anti-reflective hard coating film, an optical element, and an image display device. Here, the hard coating film is configured such that a hard coating layer as a cured coating layer is formed on at least one surface of a transparent plastic film substrate, and the material for forming the hard coating layer includes (A) urethane acrylate, (B) isocyanuric acid acrylate and (C) inorganic ultrafine particles.

However, the above documents are problematic in that it is difficult to apply the hard coating film to a foldable display because repeated folding performance is not satisfactory, and when using inorganic ultrafine particles, they are not only expensive, but also cause a problem of poor stability due to precipitation, etc.

Therefore, it is necessary to develop a hard coating film for a flexible display having high light resistance, superior anti-curling properties, and superior bending resistance under high-temperature and high-humidity conditions.

SUMMARY

Technical Problem

The present invention is intended to provide a hard coating film that may exhibit superior anti-curling properties and superior bending resistance under high-temperature and high-humidity conditions.

In addition, the present invention is intended to provide a hard coating film having high light resistance.

In addition, the present invention is intended to provide an image display device or a window for a display device, each of which includes the hard coating film described above.

Technical Solution

The present invention provides a hard coating film including a substrate and a hard coating layer provided on at least one surface of the substrate, in which, when the hard coating film is folded and unfolded 200,000 times with a bending radius of 1 mm in the direction in which the hard coating layer is oriented inwards under 60° C. and 90% relative humidity (RH), breakage does not occur, and the amount of change in transmission b* (chromaticity) of the film after UV irradiation for 100 hr using a 15 W UV-B lamp is 1.5 or less.

In addition, the present invention provides an image display device including the hard coating film described above.

In addition, the present invention provides a window for a flexible display device including the hard coating film described above.

Advantageous Effects

According to the present invention, a hard coating film can exhibit superior anti-curling properties, superior bending resistance under high-temperature and high-humidity conditions, and high light resistance, and can thus be applied not only to an image display device but also to a window for a flexible display device.

DETAILED DESCRIPTION

Mode for Invention

Hereinafter, a detailed description will be given of the present invention.

When a member is said to be located "on" another member in the present invention, it can be directly on the other member, or intervening members may be present therebetween.

When a portion is said to "comprise" or "include" an element in the present invention, this means that other elements may be further included, rather than excluding such other elements, unless otherwise specified.

An aspect of the present invention pertains to a hard coating film including a substrate and a hard coating layer provided on at least one surface of the substrate, in which, when the hard coating film is folded and unfolded 200,000 times with a bending radius of 1 mm in the direction in which the hard coating layer is oriented inwards under 60° C. and 90% RH, breakage does not occur, and the amount of change in transmission b* (chromaticity) of the film after UV irradiation for 100 hr using a 15 W UV-B lamp is 1.5 or less.

The hard coating film according to the present invention may exhibit superior anti-curling properties, superior bending resistance under high-temperature and high-humidity conditions, and high light resistance. Specifically, when the hard coating film according to the present invention is folded and unfolded 200,000 times with a bending radius of 1 mm in the direction in which the hard coating layer is oriented inwards under 60° C. and 90% RH, breakage does not occur, and the amount of change in transmission b* (chromaticity) of the film after UV irradiation for 100 hr using a 15 W UV-B lamp is 1.5 or less.

In an embodiment of the present invention, the hard coating layer may include a cured product of a hard coating composition including a first photopolymerization initiator having a maximum absorption wavelength of 250 nm or less and a second photopolymerization initiator having a maximum absorption wavelength of 300 nm or less but exceeding 250 nm.

When the hard coating film according to the present invention includes the first photopolymerization initiator having a maximum absorption wavelength of 250 nm or less and the second photopolymerization initiator having a maximum absorption wavelength of 300 nm or less but exceeding 250 nm, the above effects may be maximized, which is desirable. Specifically, the formed hard coating film may exhibit superior anti-curling properties, superior bending resistance even under high-temperature and high-humidity conditions, and high light resistance.

Specifically, the hard coating film according to the present invention may include a cured product of a hard coating composition including a first photopolymerization initiator having a maximum absorption wavelength of 250 nm or less and a second photopolymerization initiator having a maximum absorption wavelength of 300 nm or less but exceeding 250 nm.

In the present invention, the term "maximum absorption wavelength" may be understood to be the same as "$\lambda_{max}$".

As the first photopolymerization initiator, any photopolymerization initiator that is typically used in the art may be applied, so long as the maximum absorption wavelength thereof is present in the range of 250 nm or less.

For example, the first photopolymerization initiator may be a ketone-based photopolymerization initiator. More specifically, the first photopolymerization initiator may include, but is not limited to, 1-hydroxy-cyclohexylphenyl ketone and/or 2-hydroxy-2-methyl-1-phenyl-1-propan-1-one.

Commercially available products of the first photopolymerization initiator include Irgacure 184, Darocur 1173, and/or Irgacure 261, made by BASF, but are not limited thereto.

The first photopolymerization initiator may serve to cure the surface of the hard coating layer.

As the second photopolymerization initiator, any photopolymerization initiator that is typically used in the art may be applied, so long as the maximum absorption wavelength thereof is present in the range of 300 nm or less but exceeding 250 nm.

For example, the second photopolymerization initiator may be a ketone- or phenylglyoxylate-based photopolymerization initiator, and specific examples thereof may include at least one selected from among 2-hydroxy-1-[4-(2-hydroxyethoxy)phenyl]-2-methyl-1-propanone, oxy-phenyl-acetic acid 2-[2-oxo-2-phenyl-acetoxy-ethoxy]-ethyl ester, and oxy-phenyl-acetic acid 2-[2-hydroxy-ethoxy]-ethyl ester.

Commercially available products of the second photopolymerization initiator may include Irgacure 2959 and/or Irgacure 754, made by BASF, but are not limited thereto.

The second photopolymerization initiator may serve to cure the inside of the hard coating layer.

In another embodiment of the present invention, the amount of each of the first photopolymerization initiator and the second photopolymerization initiator may be 0.1 to 10 parts by weight, preferably 1 to 5 parts by weight, and more preferably 1 to 3 parts by weight, based on a total of 100 parts by weight of the hard coating composition.

When the amounts of the first photopolymerization initiator and the second photopolymerization initiator fall within the above ranges, the curing rate is appropriate, slight deterioration of mechanical properties due to insufficient curing may be suppressed, and cracking of a coating film due to overcuring may be prevented.

The amount of the first photopolymerization initiator may be 40 to 60 parts by weight, preferably 45 to 55 parts by weight, and more preferably 50 to 53 parts by weight, based on a total of 100 parts by weight of the first photopolymerization initiator and the second photopolymerization initiator, but is not limited thereto.

Here, it is preferable for the amount of the first photopolymerization initiator to fall within the above range, because there is an advantage in that the degree of surface curing of the hard coating layer is maximized.

The second photopolymerization initiator may be included in a remaining amount so as to satisfy a total of 100 parts by weight of the first photopolymerization initiator and the second photopolymerization initiator. For example, the amount of the second photopolymerization initiator may be 40 to 60 parts by weight, preferably 45 to 55 parts by weight, and more preferably 47 to 50 parts by weight, based on a total of 100 parts by weight of the first photopolymerization initiator and the second photopolymerization initiator, but is not limited thereto.

Here, when the amount of the second photopolymerization initiator falls within the above range, both the surface curing and the internal curing of the hard coating layer may be satisfactory, thus obtaining a hard coating layer having superior mechanical strength, which is desirable.

When the hard coating layer according to the present invention includes the first photopolymerization initiator and the second photopolymerization initiator, the surface curing and the internal curing of the hard coating layer are balanced, thus exhibiting not only superior anti-curling properties but also superior bending resistance even under high-temperature and high-humidity conditions, as well as high light resistance.

Specifically, when the hard coating layer according to the present invention includes the first photopolymerization initiator and the second photopolymerization initiator, compared to the case of forming a hard coating layer using a single type of initiator, the upper and lower portions thereof are cured in a balanced manner, so there is an advantage of superior bending resistance under high-temperature and high-humidity conditions.

In addition, when the hard coating layer according to the present invention includes the first photopolymerization initiator and the second photopolymerization initiator, compared to the case of using an initiator having a maximum absorption wavelength greater than 300 nm, there is an advantage of preventing the occurrence of yellowing by virtue of superior light resistance.

In short, when the hard coating layer according to the present invention includes the first photopolymerization initiator and the second photopolymerization initiator, each having a maximum absorption wavelength, it is possible to cure the upper and lower portions of the hard coating layer in a balanced manner, thereby minimizing curling, and at the same time, it is possible to prevent breakage of the film even in repeated bending resistance tests under severe conditions such as high-temperature and high-humidity conditions, and reduction in light resistance may be suppressed.

In still another embodiment of the present invention, the hard coating composition may further include at least one selected from the group consisting of a light-transmissive resin, a solvent, and an additive.

In the present invention, the light-transmissive resin is a photocurable resin, and the photocurable resin may include a photocurable (meth)acrylate oligomer or monomer, but is not limited thereto.

The photocurable (meth)acrylate oligomer may include at least one selected from among epoxy (meth)acrylate, urethane (meth)acrylate, and dendritic (meth)acrylate, with urethane (meth)acrylate being preferable.

The urethane (meth)acrylate may be prepared from a multifunctional (meth)acrylate having a hydroxyl group in the molecule and a compound having an isocyanate group in the presence of a catalyst.

Specific examples of the (meth)acrylate having a hydroxyl group in the molecule may include at least one selected from the group consisting of 2-hydroxyethyl (meth) acrylate, 2-hydroxyisopropyl (meth)acrylate, 4-hydroxybutyl (meth)acrylate, caprolactone ring-opened hydroxyacrylate, pentaerythritol tri/tetra(meth)acrylate mixtures, and dipentaerythritol penta/hexa(meth)acrylate mixtures, but are not limited thereto.

Specific examples of the compound having an isocyanate group may include at least one selected from the group consisting of 1,4-diisocyanatobutane, 1,6-diisocyanatohexane, 1,8-diisocyanatooctane, 1,12-diisocyanatododecane, 1,5-diisocyanato-2-methylpentane, trimethyl-1,6-diisocyanatohexane, 1,3-bis(isocyanatomethyl)cyclohexane, trans-1,4-cydohexene diisocyanate, 4,4'-methylenebis(cyclohexyl isocyanate), isophorone diisocyanate, toluene-2,4-diisocyanate, toluene-2,6-diisocyanate, xylene-1,4-diisocyanate, tetramethylxylene-1,3-diisocyanate, 1-chloromethyl-2,4-diisocyanate, 4,4'-methylenebis(2,6-dimethylphenyl isocyanate), 4,4'-oxybis(phenyl isocyanate), trifunctional isocyanate derived from hexamethylene diisocyanate, and trimethylene propanol adduct toluene diisocyanate, but are not limited thereto.

The dendritic (meth)acrylate is a (meth)acrylate oligomer having a dendritic structure. Here, the term "dendritic structure" refers to a shape in which a monomer is branched in a radiating form from one nucleus and polymerizes and spreads radially. The dendritic (meth)acrylate may be used without limitation, so long as it has the above-described form. Commercially available dendritic (meth)acrylate products include Miramer SP1106 made by Miwon, Viscoat 1000, Viscoat 1020, and Viscoat 1080 made by Osaka Organic Chemical, and the like.

The monomer that is used may be a typical one, and examples thereof may include those having in the molecule an unsaturated group such as a (meth)acryloyl group, a vinyl group, a styryl group, an allyl group, etc. as the photocurable functional group, and among these, a (meth)acryloyl group is preferable.

Specific examples of the monomer having a (meth)acryloyl group may include at least one selected from the group consisting of neopentyl glycol acrylate, 1,6-hexanediol (meth)acrylate, propylene glycol di(meth)acrylate, triethylene glycol di(meth)acrylate, dipropylene glycol di(meth) acrylate, polyethylene glycol di(meth)acrylate, polypropylene glycol di(meth)acrylate, trimethylolpropane tri(meth) acrylate, trimethylolethane tri(meth)acrylate, 1,2,4-cyclohexane tetra(meth)acrylate, pentaglycerol tri(meth) acrylate, pentaerythritol tetra(meth)acrylate, pentaerythritol tri(meth)acrylate, dipentaerythritol tri(meth)acrylate, dipentaerythritol penta(meth)acrylate, dipentaerythritol tetra(meth)acrylate, dipentaerythritol hexa(meth)acrylate, tripentaerythritol tri(meth)acrylate, tripentaerythritol hexa tri (meth)acrylate, bis(2-hydroxyethyl)isocyanurate di(meth) acrylate, hydroxyethyl (meth)acrylate, hydroxypropyl (meth)acrylate, hydroxybutyl (meth)acrylate, isooctyl (meth)acrylate, isodecyl (meth)acrylate, stearyl (meth)acrylate, tetrahydrofurfuryl (meth)acrylate, phenoxyethyl (meth) acrylate, and isoborneol (meth)acrylate.

As the light-transmissive resin listed above, the photocurable (meth)acrylate oligomer and monomer may be used alone or in combinations of two or more thereof In another embodiment of the present invention, the light-transmissive resin may include dendritic acrylate. The dendritic acrylate may prevent the density of crosslinking of the cured product from excessively increasing, and moreover, the radiating structure thereof serves to alleviate the rigidity of the cured product having increased crosslinking density, and thus dendritic acrylate has an advantage of providing flexibility while maintaining hardness, especially scratch resistance, when the cured product is formed. Hence, the light-transmissive resin preferably includes dendritic acrylate.

More preferably, the light-transmissive resin includes both dendritic acrylate and urethane (meth)acrylate. Here, there is an advantage in that it is possible to obtain a hard coating layer having not only high curability but also high flexibility.

When the light-transmissive resin includes both dendritic acrylate and urethane (meth)acrylate, the amount of dendritic acrylate may be 10 to 55 parts by weight, preferably 20 to 55 parts by weight, and more preferably 35 to 55 parts by weight, based on a total of 100 parts by weight of the light-transmissive resin, and urethane (meth)acrylate may be included in a remaining amount so as to satisfy 100 parts by weight of the light-transmissive resin.

The amount of the light-transmissive resin is not particularly limited, but may be 1 to 80 parts by weight, preferably 10 to 70 parts by weight, and more preferably 30 to 50 parts by weight, based on a total of 100 parts by weight of the composition for forming the hard coating layer. When the amount of the light-transmissive resin falls in the above range, hardness may be sufficiently improved and curling may be suppressed.

The solvent in the present invention is not particularly limited, and those typically used in the art may be used without limitation.

Specifically, the solvent may include, but is not limited to, alcohols (e.g., methanol, ethanol, isopropanol, butanol, methyl cellosolve, ethyl cellosolve, and the like), ketones (e.g., methyl ethyl ketone, methyl butyl ketone, methyl isobutyl ketone, diethyl ketone, dipropyl ketone, cyclohexanone, and the like), hexanes (hexane, heptane, octane, and the like), benzenes (benzene, toluene, xylene, and the like), etc.

The amount of the solvent may be 10 to 95 parts by weight, preferably 30 to 80 parts by weight, and more preferably 45 to 65 parts by weight, based on a total of 100 parts by weight of the composition for forming the hard coating layer.

When the amount of the solvent falls within the above range, appropriate viscosity may be obtained and thus high workability may result, and moreover, the hard coating layer may sufficiently swell, and the drying process may be performed for a reduced time, thus generating economic benefits.

The additive may specifically be a leveling agent, a heat stabilizer, etc., but is not limited thereto, and an additive commonly used in the art may be used within a range that does not impair the purposes of the present invention.

The leveling agent may be a silicone-based leveling agent, a fluorine-based leveling agent, an acrylic-polymer-based leveling agent, and the like. Among these, a silicone-based leveling agent capable of maintaining low surface energy by being omnipresent on the surface after coating with the hard coating composition is preferable.

Examples of the commercially available leveling agent include, but are not limited to, BYK-306, BYK-307, BYK-310, BYK-313, BYK-333, BYK-371, BYK-377, BYK-378, BYK-3440, BYK-UV3500, BYK-3550, and BYK-UV3570, made by BYK Chemie, TEGO Glide 100, TEGO Glide 450, TEGO Glide B1484, TEGO Glide 420, TEGO Glide 482, TEGO Glide 410, and TEGO Glide 415, made by Degussa, and the like.

The amount of the leveling agent may be 0.01 to 1 parts by weight, and preferably 0.1 to 1 parts by weight, based on a total of 100 parts by weight of the hard coating composition. Here, the smoothness and coatability of the coating film may be maximized and superior hardness and flexibility may also be maintained, which is desirable.

The hard coating composition according to the present invention may further include a UV stabilizer, a heat stabilizer, and the like.

Since the surface of the cured coating film degrades and becomes discolored and brittle upon continuous UV exposure, the UV stabilizer is an additive added for the purpose of protecting the adhesive by blocking or absorbing such UV rays.

The UV stabilizer may be classified into an absorber, a quencher, and a hindered amine light stabilizer (HALS), depending on the mechanism of action thereof, or may be classified into phenyl salicylate (absorber), benzophenone (absorber), benzotriazole (absorber), a nickel derivative (quencher), and a radical scavenger, depending on the chemical structure thereof. In addition, a UV stabilizer that is typical in the art may be used.

The heat stabilizer may include any one or a mixture thereof selected from among a polyphenol-based primary heat stabilizer, a phosphite-based secondary heat stabilizer, and a lactone-based secondary heat stabilizer, as commercially applicable products, but is not limited thereto.

The UV stabilizer and the heat stabilizer may be used by appropriately adjusting the amounts thereof so as not to affect UV curability.

The hard coating composition according to the present invention may further include a polymer compound, a photostimulator, an antioxidant, a UV absorber, a thermal polymerization inhibitor, a surfactant, a lubricant, an antifouling agent and the like, which are commonly used in the art, within a range that does not impair the effects of the present invention, in addition to the above components. Here, the type and amount of each additive may be appropriately selected by those of ordinary skill in the art.

The hard coating film according to the present invention includes the hard coating layer described above, and the hard coating layer is formed on at least one surface of a substrate.

The substrate may be used without particular limitation, so long as it is a substrate used in the art, and specifically, a film having superior transparency, mechanical strength, thermal stability, moisture resistance, isotropy, etc. may be used.

More specifically, the substrate may be a film including at least one selected from among thermoplastic resins, including a polyester-based resin such as polyethylene terephthalate, polyethylene isophthalate, polyethylene naphthalate, polybutylene terephthalate and the like; a cellulose-based resin such as diacetyl cellulose, triacetyl cellulose and the like; a polycarbonate-based resin; an acrylic resin such as polymethyl (meth)acrylate, polyethyl (meth)acrylate and the like; a styrene-based resin such as polystyrene, an acrylonitrile-styrene copolymer and the like; a polyolefin-based resin such as polyethylene, polypropylene, polyolefin having a cyclic or norbornene structure, an ethylene-propylene copolymer, and the like; a vinyl-chloride-based resin; an amide-based resin such as nylon, an aromatic polyamide and the like; an imide-based resin; a sulfone-based resin; a polyethersulfone-based resin; a polyetheretherketone-based resin; a polyphenylene-sulfide-based resin; a vinyl-alcohol-based resin; a vinylidene-chloride-based resin; a vinyl-butyral-based resin; an allylate-based resin; a polyoxymethylene-based resin; an epoxy-based resin, and the like, and a film including a blend of thermoplastic resins may be used. Also, a film including a (meth)acryl-, urethane-, acrylurethane-, epoxy-, or silicone-based thermosetting resin or UV-curable resin may be used.

As for the substrate, a polyimide-based resin, which has superior resistance to repeated bending and may thus be more easily applied to a flexible image display device, is preferably used.

The thickness of the substrate may be 8 to 1000 μm, and particularly 20 to 100 μm. When the thickness of the substrate falls within the above range, the strength of the film may be enhanced and thus processability may be increased, transparency may be prevented from decreasing, and the hard coating film may be lightweight.

The hard coating film according to the present invention may be formed by applying the hard coating composition as described above on one or both surfaces of the substrate and then performing curing.

The hard coating film including the hard coating layer including the cured product of the hard coating composition according to the present invention exhibits high light resistance, superior anti-curling properties, and superior bending resistance under high-temperature and high-humidity conditions.

The hard coating layer may be formed through an appropriate process selected from among die coating, air-knife coating, reverse-roll coating, spray coating, blade coating, casting, gravure coating, microgravure coating, and spin coating.

The thickness of the coating layer may be 3 μm to 200 μm, particularly 5 μm to 100 μm, and more particularly 8 μm to 30 μm, but is not limited thereto. Here, when the thickness of the coating layer satisfies the above range, it is possible to manufacture a hard coating film that is both hard and flexible, is capable of being formed thinly, and seldom exhibits a curling phenomenon. The thickness of the coating layer is the thickness after drying.

The hard coating composition that is applied is dried through evaporation of volatile materials for 10 sec to 1 hr, and particularly 30 sec to 10 min, at a temperature of 30 to 150° C. Thereafter, the hard coating composition is irradiated with UV light and cured. Here, the dose of UV light may be about 0.01 to 10 $J/cm^2$, and particularly 0.1 to 2 $J/cm^2$.

The hard coating film may be used for a flexible display, and specifically, it may be used to replace a touch panel for displays such as LCDs, OLEDs, LEDs, FEDs, etc., various mobile communication terminals using the same, smartphones or tablet PCs, and a cover glass for electronic paper, or may be used as a functional layer.

Another aspect of the present invention pertains to an image display device including the hard coating film described above.

The image display device may include a liquid crystal display device, an OLED, a flexible display, and the like, but is not limited thereto, and all types of image display devices known in the art may be applicable.

Still another aspect of the present invention pertains to a window for a flexible display device including the hard coating film described above.

The window may serve to protect elements included in the image display device from external impacts or changes in ambient temperature and humidity.

The hard coating film according to the present invention satisfies the pencil hardness and scratch resistance required of a hard coating film, and at the same time, the surface and the inside of the hard coating layer are subjected to balanced curing, thus exhibiting superior anti-curling properties, superior bending resistance under high-temperature and high-humidity conditions, and high light resistance. Also, since it is resistant to repeated folding, it may be applied to a window for a flexible display device.

Specifically, when the hard coating film according to the present invention is folded and unfolded 200,000 times with a bending radius of 1 mm in the direction in which the hard coating layer is oriented inwards under high-temperature and high-humidity conditions, particularly at 60° C. and 90% RH, breakage does not occur, and the amount of change in transmission b* (chromaticity) of the film after UV irradiation for 100 hr using a 15 W UV-B lamp is 1.5 or less.

A better understanding of the present invention may be obtained via the following examples. However, the examples of the present invention may be modified in various forms, and the scope of the present specification is not to be construed as being limited to the following examples. The examples of the present invention are provided to more fully explain the present specification to those having ordinary knowledge in the art to which the present invention pertains. Unless otherwise mentioned, "%" and "part", indicating amounts in the following examples, are given on a weight basis.

Preparation Examples: Preparation of Hard Coating Composition

Preparation Example 1

A hard coating composition was prepared by mixing 25 parts by weight of dendritic acrylate (Miwon, Miramer SP1106), 22 parts by weight of 6-functional urethane acrylate (Kyoeisha Chemical, UA-306I), 50 parts by weight of methyl ethyl ketone, 1.4 parts by weight of Irgacure 184 (BASF, maximum absorption wavelength: 246 nm), 1.3 parts by weight of Irgacure 2959 (BASF, maximum absorption wavelength: 276 nm), and 0.3 parts by weight of a silicone-based additive (BYK, BYK-307) using a stirrer, followed by filtration using a filter made of a PP material.

Preparation Example 2

A hard coating composition was prepared by mixing 25 parts by weight of dendritic acrylate (Miwon, Miramer SP1106), 22 parts by weight of 6-functional urethane acrylate (Kyoeisha Chemical, UA-306I), 50 parts by weight of methyl ethyl ketone, 1.4 parts by weight of Irgacure 184 (BASF, maximum absorption wavelength: 246 nm), 1.3 parts by weight of Irgacure 754 (BASF, maximum absorption wavelength: 255 nm), and 0.3 parts by weight of a silicone-based additive (BYK, BYK-307) using a stirrer, followed by filtration using a filter made of a PP material.

Preparation Example 3

A hard coating composition was prepared by mixing 25 parts by weight of dendritic acrylate (Miwon, Miramer SP1106), 22 parts by weight of 6-functional urethane acrylate (Kyoeisha Chemical, UA-306I), 50 parts by weight of methyl ethyl ketone, 1.4 parts by weight of Darocur 1173 (BASF, maximum absorption wavelength: 245 nm), 1.3 parts by weight of Irgacure 2959 (BASF, maximum absorption wavelength: 276 nm), and 0.3 parts by weight of a silicone-based additive (BYK, BYK-307) using a stirrer, followed by filtration using a filter made of a PP material.

Preparation Example 4

A hard coating composition was prepared by mixing 25 parts by weight of dendritic acrylate (Miwon, Miramer SP1106), 22 parts by weight of 6-functional urethane acrylate (Kyoeisha Chemical, UA-306I), 50 parts by weight of methyl ethyl ketone, 1.4 parts by weight of Darocur 1173 (BASF, maximum absorption wavelength: 245 nm), 1.3 parts by weight of Irgacure 754 (BASF, maximum absorption wavelength: 255 nm), and 0.3 parts by weight of a silicone-based additive (BYK, BYK-307) using a stirrer, followed by filtration using a filter made of a PP material.

Preparation Example 5

A hard coating composition was prepared by mixing 47 parts by weight of 6-functional urethane acrylate (Kyoeisha Chemical, UA-306I), 50 parts by weight of methyl ethyl ketone, 1.4 parts by weight of Irgacure 184 (BASF, maximum absorption wavelength: 246 nm), 1.3 parts by weight of Irgacure 2959 (BASF, maximum absorption wavelength: 276 nm), and 0.3 parts by weight of a silicone-based additive (BYK, BYK-307) using a stirrer, followed by filtration using a filter made of a PP material.

Preparation Example 6

A hard coating composition was prepared by mixing 25 parts by weight of dendritic acrylate (Miwon, Miramer SP1106), 22 parts by weight of 6-functional urethane acrylate (Kyoeisha Chemical, UA-306I), 50 parts by weight of methyl ethyl ketone, 2.7 parts by weight of Irgacure 184 (BASF, maximum absorption wavelength: 246 nm), and 0.3 parts by weight of a silicone-based additive (BYK, BYK-307) using a stirrer, followed by filtration using a filter made of a PP material.

Preparation Example 7

A hard coating composition was prepared by mixing 25 parts by weight of dendritic acrylate (Miwon, Miramer SP1106), 22 parts by weight of 6-functional urethane acrylate (Kyoeisha Chemical, UA-306I), 50 parts by weight of methyl ethyl ketone, 2.7 parts by weight of Irgacure 754 (BASF, maximum absorption wavelength: 255 nm), and 0.3 parts by weight of a silicone-based additive (BYK, BYK-307) using a stirrer, followed by filtration using a filter made of a PP material.

Preparation Example 8

A hard coating composition was prepared by mixing 25 parts by weight of dendritic acrylate (Miwon, Miramer SP1106), 22 parts by weight of 6-functional urethane acrylate (Kyoeisha Chemical, UA-306I), 50 parts by weight of methyl ethyl ketone, 1.4 parts by weight of Irgacure 184 (BASF, maximum absorption wavelength: 246 nm), 1.3 parts by weight of Irgacure 369 (BASF, maximum absorption wavelength: 324 nm), and 0.3 parts by weight of a silicone-based additive (BYK, BYK-307) using a stirrer, followed by filtration using a filter made of a PP material.

Preparation Example 9

A hard coating composition was prepared by mixing 25 parts by weight of dendritic acrylate (Miwon, Miramer SP1106), 22 parts by weight of 6-functional urethane acrylate (Kyoeisha Chemical, UA-306I), 50 parts by weight of methyl ethyl ketone, 2.7 parts by weight of Irgacure 369 (BASF, maximum absorption wavelength: 324 nm), and 0.3 parts by weight of a silicone-based additive (BYK, BYK-307) using a stirrer, followed by filtration using a filter made of a PP material.

EXAMPLES AND COMPARATIVE EXAMPLES

Example 1

The hard coating composition of Preparation Example 1 was applied on a polyimide film (Sumitomo Chemical, 50 µm) such that the thickness thereof after curing was 10 µm, after which the solvent was dried at 80° C. for 2 min, followed by irradiation with UV light at a cumulative dose of 400 mJ/cm$^2$ in a nitrogen atmosphere, thereby manufacturing a hard coating film.

Example 2

A hard coating film was manufactured in the same manner as in Example 1, with the exception that the hard coating composition of Preparation Example 2 was used in lieu of the hard coating composition used in Example 1.

Example 3

A hard coating film was manufactured in the same manner as in Example 1, with the exception that the hard coating composition of Preparation Example 3 was used in lieu of the hard coating composition used in Example 1.

Example 4

A hard coating film was manufactured in the same manner as in Example 1, with the exception that the hard coating composition of Preparation Example 4 was used in lieu of the hard coating composition used in Example 1.

Comparative Example 1

A hard coating film was manufactured in the same manner as in Example 1, with the exception that the hard coating composition of Preparation Example 5 was used in lieu of the hard coating composition used in Example 1.

Comparative Example 2

A hard coating film was manufactured in the same manner as in Example 1, with the exception that the hard coating composition of Preparation Example 6 was used in lieu of the hard coating composition used in Example 1.

Comparative Example 3

A hard coating film was manufactured in the same manner as in Example 1, with the exception that the hard coating composition of Preparation Example 7 was used in lieu of the hard coating composition used in Example 1.

Comparative Example 4

A hard coating film was manufactured in the same manner as in Example 1, with the exception that the hard coating composition of Preparation Example 8 was used in lieu of the hard coating composition used in Example 1.

Comparative Example 5

A hard coating film was manufactured in the same manner as in Example 1, with the exception that the hard coating composition of Preparation Example 9 was used in lieu of the hard coating composition used in Example 1.

Test Examples (1) Curling

The hard coating film manufactured in each of Examples and Comparative Examples was cut to a size of 10 cm (width)×10 cm (length), and was then allowed to stand for 24 hr under conditions of 25° C. and 50% RH such that the surface of the hard coating layer was oriented upwards, after which the distance of the four vertices thereof from the bottom was measured. The results thereof are shown in Table 1 below, and the evaluation criteria are as follows.

◎: 0 to less than 5 mm

○: 5 mm to less than 10 mm

×: 10 mm or more (2) Pencil Hardness

The hard coating film was fixed to glass such that the surface of the hard coating layer was oriented upwards, after which the pencil hardness of the hard coating film was measured under a load of 1 kg using a pencil hardness tester (PHT, Seokbo Science). Specifically, the hardness of a pencil that did not produce a scratch at least four out of five times was determined to be the final pencil hardness of the film, and the results thereof are shown in Table 1 below.

(3) Scratch Resistance

A substrate film was attached to glass using a transparent pressure-sensitive adhesive such that the surface of the hard coating layer was oriented upwards, after which scratch resistance was measured through reciprocating friction 10 times using steel wool (#0000) with a load of 500 g/cm$^2$ applied thereto. The evaluation criteria were as follows, and the results thereof are shown in Table 1 below.

○: When the measurement portion is observed through transmission and reflection using a triple-wavelength lamp, scratches are imperceptible, or 10 or fewer scratches are visible.

×: When the measurement portion is observed through transmission and reflection using a triple-wavelength lamp, more than 10 scratches are visible.

(4) Bending Resistance

The film was tested by being repeatedly folded and unfolded 200,000 times with a bending radius of 1 mm in the direction in which the surface of the hard coating layer was oriented inwards under conditions of 60° C. and 90% RH, and whether the film broke was observed. The evaluation criteria were as follows, and the results thereof are shown in Table 1 below.

○: No breakage

×: Breakage (5) Light Resistance

The hard coating film was fixed to glass such that the surface of the hard coating layer was oriented upwards, followed by UV irradiation for 100 hr using a UV tester (Sankyo Denki, CT-UVT, 15 W UV-B lamp), after which the amount of change in transmission b* (chromaticity) of the hard coating film before and after UV irradiation was determined. The chromaticity value (b*) was measured using a colorimeter (OPS-SP2000, Olympus). The evaluation criteria were as follows, and the results thereof are shown in Table 1 below.

○: Change amount of 1.5 or less

×: Change amount greater than 1.5

TABLE 1

| | Hard coating composition | Curling | Pencil hardness | Scratch resistance | Bending resistance | Light resistance |
|---|---|---|---|---|---|---|
| Example 1 | Preparation Example 1 | ◎ | 3H | ○ | ○ | ○ |
| Example 2 | Preparation Example 2 | ○ | 3H | ○ | ○ | ○ |
| Example 3 | Preparation Example 3 | ◎ | 3H | ○ | ○ | ○ |
| Example 4 | Preparation Example 4 | ○ | 3H | ○ | ○ | ○ |
| Comparative Example 1 | Preparation Example 5 | X | 3H | ○ | X | ○ |
| Comparative Example 2 | Preparation Example 6 | X | 3H | ○ | X | ○ |
| Comparative Example 3 | Preparation Example 7 | X | 3H | ○ | X | ○ |
| Comparative Example 4 | Preparation Example 8 | ○ | 3H | ○ | ○ | X |
| Comparative Example 5 | Preparation Example 9 | X | 3H | ○ | X | X |

As is apparent from Table 1, the hard coating film according to the present invention exhibited superior bending resistance and light resistance and satisfied curling, pencil hardness and scratch resistance required of a hard coating film. Specifically, the hard coating film of Examples having the cured layer of the hard coating composition including a first photopolymerization initiator having a maximum absorption wavelength of 250 nm or less and a second photopolymerization initiator having a maximum absorption wavelength of 300 nm or less but exceeding 250 nm exhibited superior anti-curling properties, superior bending resistance under high-temperature and high-humidity conditions, and high light resistance.

The invention claimed is:

1. A hard coating film, comprising:
   a substrate; and
   a hard coating layer provided on at least one surface of the substrate, wherein the hard coating layer comprises a cured product of a hard coating composition comprising a first photopolymerization initiator having a maximum absorption wavelength of 250 nm or less and a second photopolymerization initiator having a maximum absorption wavelength of 300 nm or less but exceeding 250 nm, and
   wherein, when the hard coating film is folded and unfolded 200,000 times with a bending radius of 1 mm in a direction in which the hard coating layer is oriented inwards under 60° C. and 90% relative humidity (RH), breakage does not occur, and an amount of change in transmission b* (chromaticity) of the film after UV irradiation for 100 hr using a 15 W UV-B lamp is 1.5 or less.

2. The hard coating film of claim 1, wherein the hard coating composition further comprises at least one selected from the group consisting of a light-transmissive resin, a solvent, and an additive.

3. The hard coating film of claim 2, wherein the light-transmissive resin comprises dendritic acrylate.

4. The hard coating film of claim 1, wherein an amount of each of the first photopolymerization initiator and the second photopolymerization initiator is 0.1 to 10 parts by weight based on a total of 100 parts by weight of the hard coating composition.

5. An image display device comprising the hard coating film of claim 1.

6. A window for a flexible display device comprising the hard coating film of claim 1.

* * * * *